(12) United States Patent  
Haraguchi et al.

(10) Patent No.: US 9,085,105 B2  
(45) Date of Patent: Jul. 21, 2015

(54) FOAM MOLDING MOLD AND FOAM MOLDING METHOD

(75) Inventors: Hirokazu Haraguchi, Yokohama (JP); Masanori Okumura, Yokohama (JP); Taichi Itabashi, Yokohama (JP); Masakazu Igarashi, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 539 days.

(21) Appl. No.: 12/991,990

(22) PCT Filed: May 21, 2009

(86) PCT No.: PCT/JP2009/059327  
§ 371 (c)(1), (2), (4) Date: Nov. 10, 2010

(87) PCT Pub. No.: WO2009/145102  
PCT Pub. Date: Dec. 3, 2009

(65) Prior Publication Data  
US 2011/0062613 A1 Mar. 17, 2011

(30) Foreign Application Priority Data

May 28, 2008 (JP) .................................. 2008-139704  
May 28, 2008 (JP) .................................. 2008-139705

(51) Int. Cl.  
*B29C 65/76* (2006.01)  
*B29C 44/58* (2006.01)  
(Continued)

(52) U.S. Cl.  
CPC ............... *B29C 44/58* (2013.01); *B29C 44/351* (2013.01); *B29C 45/2608* (2013.01); (Continued)

(58) Field of Classification Search  
CPC ................. B29C 45/2608; B29C 2045/14934; B29C 2045/1718; B29C 2045/1741; B29C 2045/2732; B29C 44/351; B29C 44/58

USPC ....... 425/4 R, 542, 589, 816, 817 R, DIG. 47, 425/450.1  
See application file for complete search history.

(56) References Cited

U.S. PATENT DOCUMENTS 2,288,263 A 6/1942 Bostwick  
2,731,669 A * 1/1956 Talalay ..................... 425/215  
(Continued)

FOREIGN PATENT DOCUMENTS

CN 1181305 A 5/1998  
EP 1127670 A2 8/2001  
(Continued)

OTHER PUBLICATIONS

International Search Report for PCT/JP2009/059327 dated Jul. 28, 2009 (5 pages).

(Continued)

*Primary Examiner* — Seyed Masoud Malekzadeh  
(74) *Attorney, Agent, or Firm* — Sughrue Mion, PLLC

(57) ABSTRACT

A mold for foam molding which can sufficiently prevent burrs from being formed on a molded product, and a foam molding method using the mold are provided. A groove 6 into which a packing seal is to be fitted is formed in a mating surface 3a of a lower mold 3 so as to extend around a cavity 7. The groove 6 has a deep groove portion 6a which is deeply recessed from the mating surface 3a, and a shallow groove portion 6b which is located on the cavity 7 side with respect to the deep groove portion 6a and which continues to the deep groove portion 6a. A portion of the mating surface 3a that extends from its edge on the cavity 7 side down to the groove 6 has a width "a" of from 0.1 mm to 10 mm. A packing seal 5 has a base portion 5a which is inserted into the deep groove portion 6a, and an overhang portion 5b which continues to the base portion 5a and is engaged with the shallow groove portion 6b.

11 Claims, 8 Drawing Sheets

(51) Int. Cl.
  *B29C 45/26* (2006.01)
  *B29C 44/34* (2006.01)
  *B29C 45/17* (2006.01)
  *B29C 45/14* (2006.01)
  *B29C 45/27* (2006.01)

(52) U.S. Cl.
  CPC ............. *B29C 2045/14934* (2013.01); *B29C 2045/1718* (2013.01); *B29C 2045/1741* (2013.01); *B29C 2045/2732* (2013.01)

(56) References Cited

U.S. PATENT DOCUMENTS

| | | | | |
|---|---|---|---|---|
| 4,479,914 | A * | 10/1984 | Baumrucker | 264/45.5 |
| 5,183,617 | A * | 2/1993 | Saitoh | 264/249 |
| 6,558,587 | B1 * | 5/2003 | Leicht | 264/39 |
| 6,649,097 | B2 * | 11/2003 | Sasaki et al. | 264/102 |
| 6,896,235 | B2 * | 5/2005 | Shimazaki | 249/160 |
| 6,905,643 | B2 * | 6/2005 | Junker et al. | 264/46.4 |
| 7,479,245 | B2 * | 1/2009 | Barz et al. | 264/267 |
| 2002/0041054 | A1 * | 4/2002 | Leicht | 264/255 |
| 2003/0146533 | A1 * | 8/2003 | Gornell | 264/45.4 |
| 2007/0145634 | A1 * | 6/2007 | Rawlings et al. | 264/219 |
| 2008/0315533 | A1 * | 12/2008 | Janotta | 277/646 |
| 2009/0140447 | A1 * | 6/2009 | Kawamura et al. | 264/51 |

FOREIGN PATENT DOCUMENTS

| | | |
|---|---|---|
| JP | 62-185015 A | 11/1987 |
| JP | 6-42130 A | 6/1994 |
| JP | 11-207774 A | 8/1999 |
| JP | 2004-130629 A | 4/2004 |
| JP | 2005003181 A | 1/2005 |
| JP | 2005-81574 A | 3/2005 |
| JP | 2006-35590 A | 2/2006 |

OTHER PUBLICATIONS

Chinese Office Action issued in Chinese Application No. 200980119543.2 dated Jan. 14, 2013.
Japanese Office Action issued in Japanese Application No. 2008-139704 dated Jun. 25, 2013.
Japanese Office Action issued in Japanese Application No. 2008-139705 dated Jun. 25, 2013.
Communication dated May 8, 2015, issued by the European Patent Office in corresponding European Application No. 09754610.5.

* cited by examiner

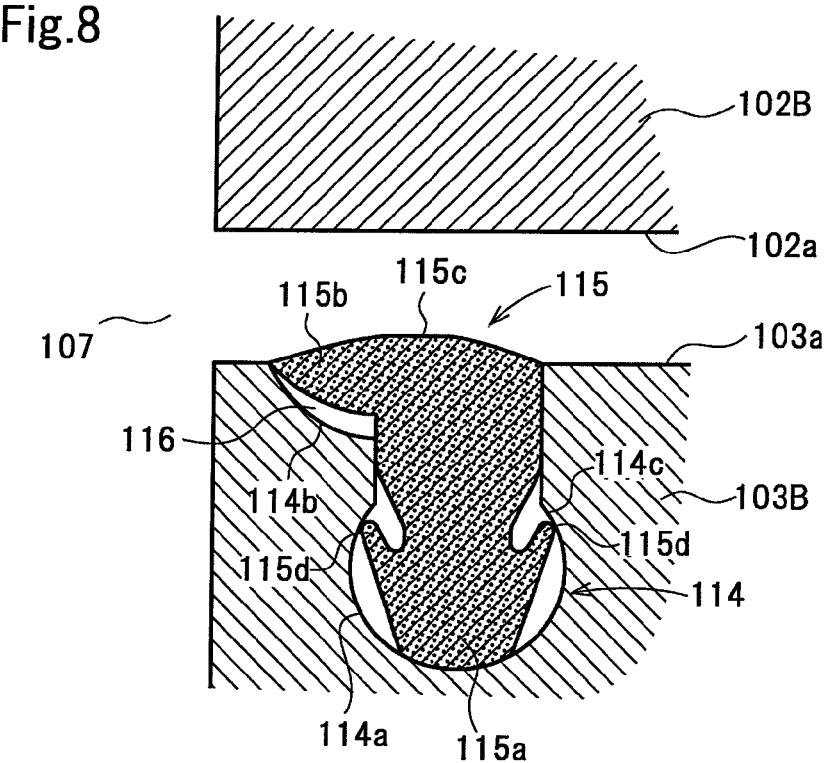
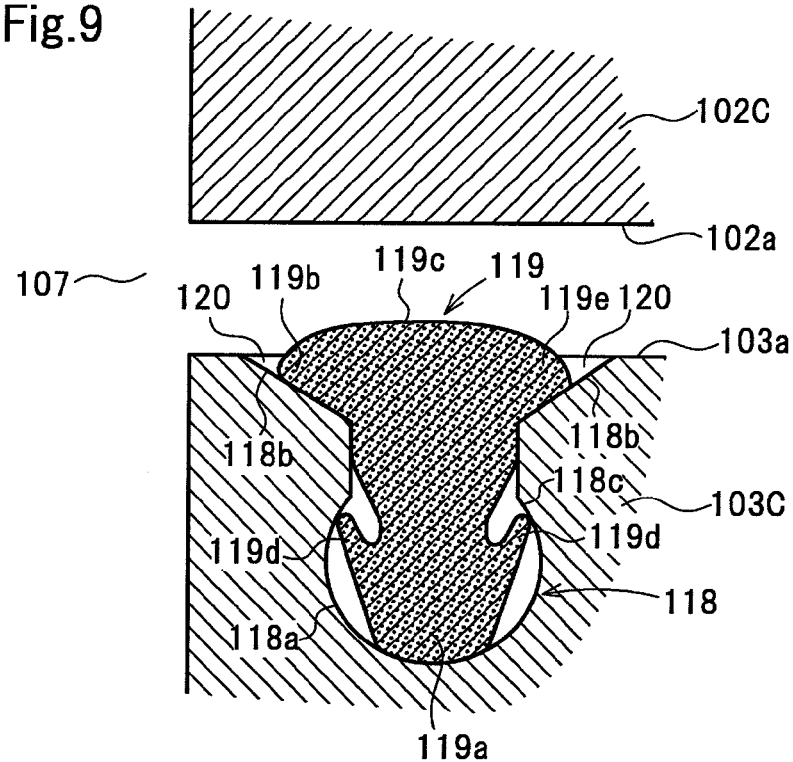

000# FOAM MOLDING MOLD AND FOAM MOLDING METHOD

FIELD OF INVENTION

The present invention relates to a mold for producing a resin foam molded product such as a seat pad, and more particularly, to a mold having a packing seal provided between mating surfaces of pieces of the mold. Furthermore, the present invention relates to a foam molding method using the mold.

BACKGROUND OF INVENTION

Foam molding of plasticized polyurethane foam for an automotive seat pad, for example, is performed by introducing an undiluted urethane solution into a mold and foaming the same in the mold. The mold generally has an upper mold and a lower mold.

I. Japanese Unexamined Utility Model Registration Application Publication No. 62-185015 discloses a packing seal provided between mating surfaces of the upper mold and the lower mold.

FIG. 11 is a cross-sectional view of a packing seal portion according to Japanese Unexamined Utility Model Registration Application Publication No. 62-185015. A lower mold 40 has a mating surface 41 provided with a groove 42 which has a circular arc shape in cross section. A packing seal 50 has a lower portion 51 fitted into the groove 42.

The packing seal has an upper portion protruding above the mating surface 41 and thereby forms a sheet portion 52 which spreads over the mating surface 41. It is noted that the sheet portion 52 has a part provided with a protrusion 53.

II. Japanese Unexamined Utility Model Registration Application Publication No. 6-42130 also discloses a groove provided in a mating surface of a lower mold, wherein the groove has a circular arc shape in cross section.

FIG. 12 is a cross-sectional view illustrating the vicinity of a mating surface of a lower mold according to Japanese Unexamined Utility Model Registration Application Publication No. 6-42130. A lower mold 61 has a mating surface provided with a groove 62 which has a circular arc shape in cross section, and a packing seal 63 having a circular shape in cross section is fitted into the groove 62. The packing seal has an upper portion protruding above the mating surface of the lower mold 61.

Patent literature 1: Japanese Unexamined Utility Model Registration Application Publication No. 62-185015

Patent literature 2: Japanese Unexamined Utility Model Registration Application Publication No. 6-42130

The sheet portion 52 in Japanese Unexamined Utility Model Registration Application Publication No. 62-185015 is kept away (or, set back) from an edge 44 on the cavity 43 side. Therefore, in the state where the mold is clamped, there is a gap between the mating surfaces from their edges on the cavity 43 side down to the sheet portion 52.

In the case where this mold is used for molding a seat pad, if there is any portion exhibiting poor airtightness between the upper mold and the packing seal 50, urethane will penetrate into between the mating surfaces and thereby form burrs.

Such burrs need to be removed manually after the demolding process, thereby making the production of the seat pads or other molded products troublesome and costly.

Furthermore, referring to FIG. 11, the groove 42 has an approximately circular shape in cross section. Thus, if the groove 42 is formed too close to the cavity 43, the lower mold 40 between the groove 42 and the cavity 43 will be reduced in thickness, which leads to an insufficient strength and also gives rise to a need for an unnecessary high processing accuracy. It is thus necessary to keep the groove 42 away from the cavity 43 to a certain extent, resulting in a large distance between the sheet portion 52 and the cavity 43.

In Japanese Unexamined Utility Model Registration Application Publication No. 6-42130 as well, the groove 62 and the packing seal 63 fitted into the groove 62 are kept away from the cavity side edge of the mating surface of the lower mold 61.

Particularly, the packing seal 63 has no portion equivalent to the sheet portion 52 provided in Japanese Unexamined Utility Model Registration Application Publication No. 62-185015, and a larger gap is thereby produced between the mating surfaces from their cavity side edges down to the packing seal 63.

Therefore, in the case where the mold of Japanese Unexamined Utility Model Registration Application Publication No. 6-42130 is used for molding a seat pad, there will be a greater amount of urethane that will penetrate into between the mating surfaces and thereby form burrs than in the case of using the mold of Japanese Unexamined Utility Model Registration Application Publication No. 62-185015.

SUMMARY OF INVENTION

An object of the present invention is to solve the above-described conventional problems and to provide a mold for foam molding which is capable of sufficiently preventing formation of burrs on a molded product, and a foam molding method using the mold.

A mold for foam molding according to a first aspect of the present invention includes a packing seal provided between mating surfaces of pieces of the mold so as to extend along a cavity of the mold, the packing seal being held in a groove provided in the mating surface, wherein in the state where the mold is open, a void portion is provided along the packing seal, and upon clamping of the mold, the packing seal is pushed into the void portion.

In the above-described foam molding mold having the packing seal provided between the mating surfaces of the pieces of the mold so as to extend along the cavity of the mold, the packing seal being held in the groove provided in the mating surface, a portion of the mating surface that extends from its edge on the cavity side to a near end of the groove may have a width of from 0.1 mm to 10 mm.

In the foam molding mold described above, the groove may include a deep groove portion and a shallow groove portion which continues to the deep groove portion, and the packing seal may include a base portion which is fitted into the deep groove portion and an overhang portion which continues to the base portion and is engaged with the shallow groove portion.

In the foam molding mold described above, the shallow groove portion may be located at least closer to the cavity side than the deep groove portion.

In the foam molding mold described above, the above-mentioned width may be from 0.1 mm to 5 mm.

In the foam molding mold described above, the groove may include a deep groove portion and a shallow groove portion which continues to the deep groove portion, the packing seal may include a base portion which is fitted into the deep groove portion and an overhang portion which continues to the base portion and is engaged with the shallow groove portion, and in the state where the mold is open, the void portion may be provided between the overhang portion and the shallow groove portion.

In the foam molding mold described above, in the state where the mold is open, the overhang portion may have at least a part separated from the shallow groove portion, and the void portion may be formed between the separated part and a bottom of the shallow groove portion.

In the foam molding mold described above, the void may have a width in a groove depth direction that increases with increasing distance from the deep groove portion.

In the foam molding mold described above, the void may have a width in a groove depth direction that decreases with increasing distance from the deep groove portion.

In the foam molding mold described above, the void portion may have a void width in a groove depth direction of not greater than 10 mm.

In the foam molding mold described above, the shallow groove portion may have a width in a direction along the mating surface of from 1 mm to 15 mm.

In the foam molding mold described above, the overhang portion, in the vicinity of its end in a direction away from the deep groove portion, may have a thickness that decreases with increasing distance from the deep groove portion.

A foam molding method according to a second aspect of the present invention uses the above-described mold for foam molding.

The foam molding method may be used to foam mold a seat pad.

In the mold according to the first aspect and the foam molding method according to the second aspect, the void portion is provided along the packing seal in the state where the mold is open, and the packing seal is pushed into this void portion when the mold is clamped. According to the present invention, during the mold clamping process, the packing seal is not only compression-deformed to be reduced in thickness, but also deformed so as to be pushed into the void portion, thereby ensuring good sealing performance. Furthermore, even if a gas pressure is applied to the packing seal during foam molding, the packing seal can sufficiently resist the gas pressure to prevent leakage of the gas. As a result, no or almost no urethane will penetrate into between the mating surfaces, so that formation of burrs can be prevented.

In the mold and the foam molding method described above, the portion of the mating surface that extends from its edge on the cavity side to the near end of the groove is as small as 0.1 to 10 mm in width, and the packing seal is held in the groove. This ensures a small distance between the cavity and the packing seal. Therefore, in the case where a deformed material such as urethane is about to penetrate into between the mating surfaces during foam molding, the gas pressure between the mating surfaces increases, thereby preventing the molding material such as urethane from entering into between the mating surfaces. This prevents formation of burrs, and also prevents deterioration of the packing seal that would otherwise be caused by contact of urethane or the like with the packing seal.

In the mold described above, the groove has the deep groove portion, and the packing seal has the base portion that is sufficiently deeply fitted into the deep groove portion. This ensures that the packing seal 5 has a high fitting strength.

In the mold described above, the shallow groove portion is located at least closer to the cavity side than the deep groove portion. Therefore, even in the case where the portion of the mating surface that extends from its cavity side edge to the near end of the groove is sufficiently reduced in width, a large distance is maintained between the deep groove portion and the cavity. This ensures that the mold has a high strength at the mating surface in the vicinity of the cavity. The accuracy required in processing the groove is also reduced.

In the mold described above, during the mold clamping process, the overhang portion is pressed from both sides so as to be pushed into the void portion, which ensures good sealing performance.

In the mold described above, during the mold clamping process, the overhang portion is deformed to achieve a close contact with the bottom of the groove, again ensuring good sealing performance.

In the mold described above, during the mold clamping process, the overhang portion is compression-deformed sufficiently enough to become flat, thereby ensuring good sealing performance.

BRIEF DESCRIPTION OF DRAWINGS

FIG. 1b is an enlarged view of the Ib part in FIG. 1a.

FIG. 5b is an enlarged view of the Vb part in FIG. 5a.

FIG. 8 is a cross-sectional view of a part of the mold according to another embodiment.

FIG. 9 is a cross-sectional view of a part of the mold according to another embodiment.

DETAILED DESCRIPTION

Figure 1A:
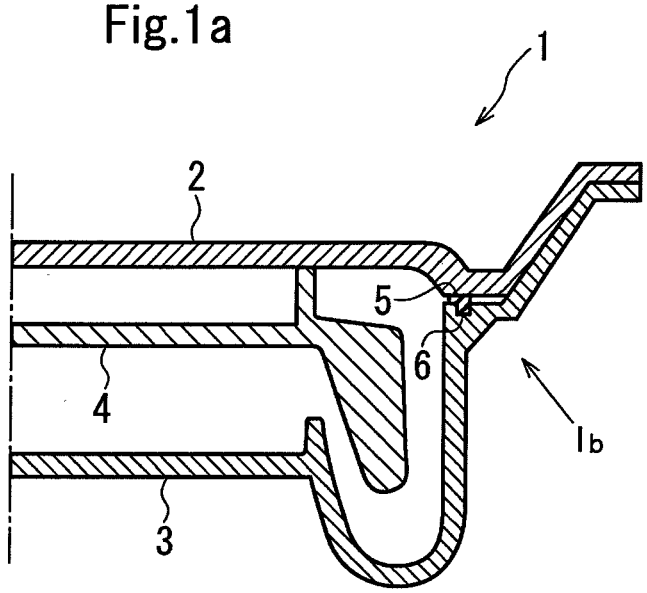
FIG. 1a is a longitudinal sectional view of the right half of a mold for molding a seat back pad according to a first embodiment.
Figure 1B:
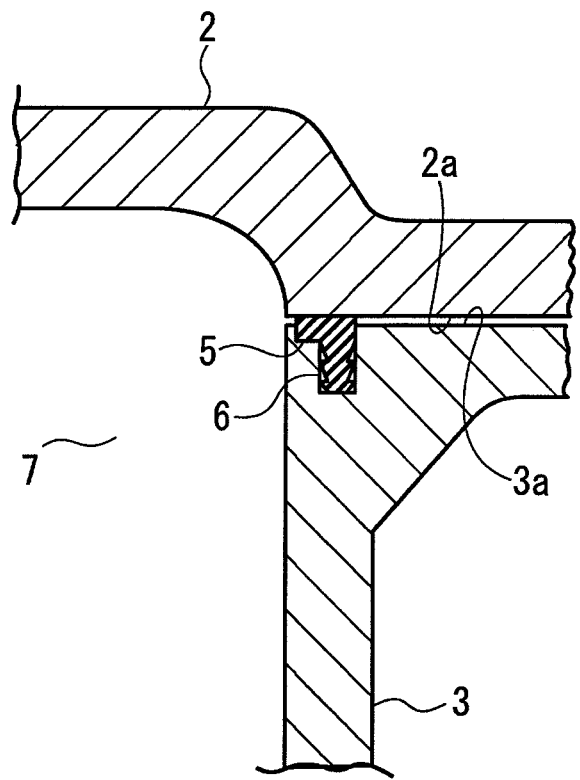
Figure 2A:
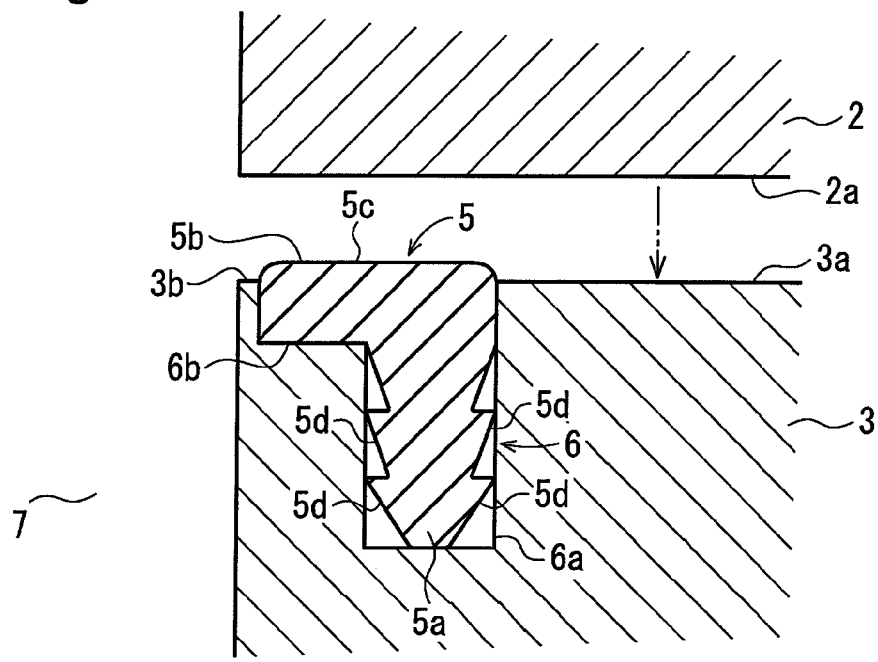
FIGS. 2a and 2b are is an enlarged view of the Ib part just before the mold shown in FIG. 1 is clamped.
Figure 2B:
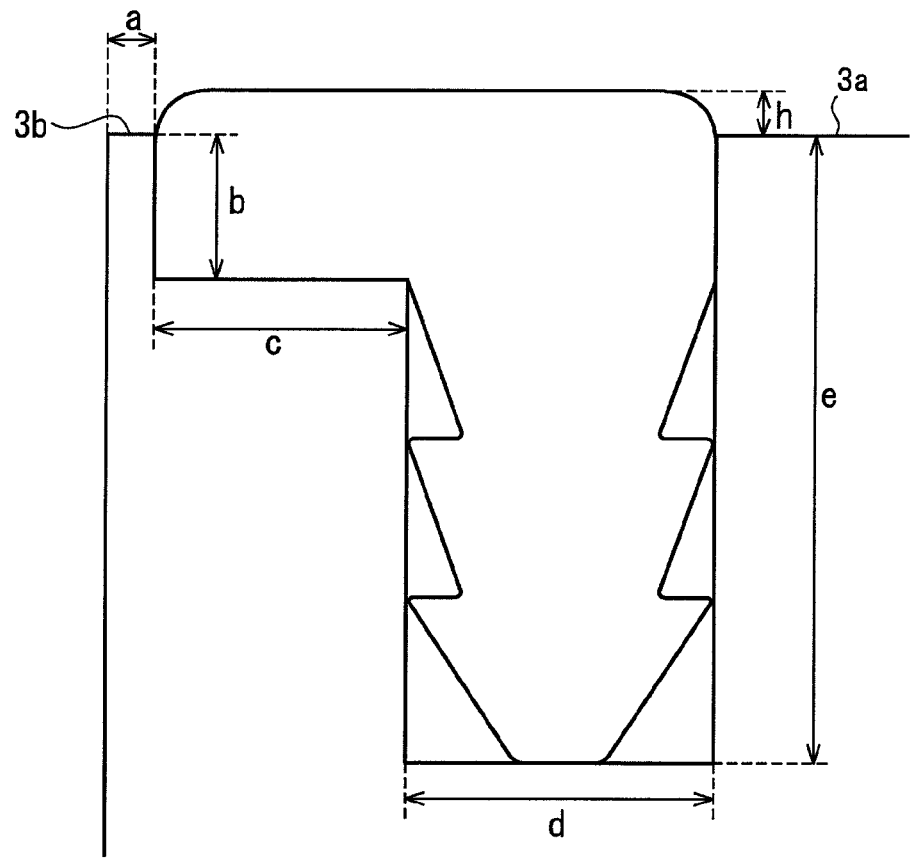

A first embodiment of the present invention will now be described with reference to the drawings. FIG. 1a is a longitudinal sectional view of the right half of a mold for molding a seat back pad according to the embodiment. FIG. 1b is an enlarged view of the Ib part in FIG. 1a. FIG. 2a is an enlarged view of the Ib part immediately before the mold is clamped. FIG. 2b is an explanatory diagram of dimensions of the packing seal portion.

A mold 1 according to the present embodiment is for use in molding an automotive seat back pad, and includes an upper mold 2, a lower mold 3, and a core 4 held by the upper mold 2. A packing seal 5 is provided between a mating surface of the upper mold 2 and a mating surface of the lower mold 3.

As clearly shown in FIGS. 2a and 2b, according to the present embodiment, a groove 6 into which the packing seal is to be fitted is formed in a mating surface 3a of the lower mold 3 so as to extend around a cavity 7.

The groove 6 has a deep groove portion 6a which is deeply recessed from the mating surface 3a, and a shallow groove portion 6b which is shallower than the deep groove portion 6a and which is located on the same side as the cavity 7 with respect to the deep groove portion 6a and continues to the deep groove portion 6a. The shallow groove portion 6b has a rectangular shape in cross section, with approximately the same depth along the width direction (corresponding to the horizontal direction in FIG. 2a) and along the longitudinal direction of the groove 6 (corresponding to the direction perpendicular to the plane of the paper in FIG. 2a).

A portion of the lower mold 3 that extends from its edge on the cavity 7 side to the shallow groove portion 6b constitutes an inner edge portion 3b (FIG. 2a).

The packing seal 5 has a base portion 5a inserted into the deep groove portion 6a, and an overhang portion 5b which continues to the base portion 5a and is engaged with the shallow groove portion 6b. With the base portion 5a fitted in the deep groove portion 6a, the packing seal 5 is attached to the lower mold 3. It is noted that the base portion 5a has its side surface provided with a saw-tooth cross-section portion 5d for the purposes of facilitating insertion of the packing seal into the deep groove portion 6a and preventing the packing seal from easily slipping off from the deep groove portion 6a. The overhang portion 5b has its underside abutted against the bottom of the shallow groove portion 6b.

The packing seal 5 is made of rubber or an elastomer (preferably, one having a high resilience such as olefin elastomer, silicone rubber, or fluorocarbon rubber).

The packing seal 5 has a protruding portion 5c protruding above the mating surface 3a. The protruding portion 5c has an approximately horizontal surface at the top thereof. Alternatively, the top surface of the packing seal 5 may have a triangular shape in cross section, which is highest at the center and gradually decreases in height from the center toward the cavity side and toward the side opposite thereto, or may have a circular arc shape, a trapezoidal shape, or another shape in cross section.

The upper mold 2 has a mating surface 2a which is configured to be flat.

Referring to FIG. 2b, the mating surface 3a on the inner edge portion 3b, extending from the cavity 7 side edge to the groove 6, has a width "a" of from 0.1 mm to 10 mm, preferably from 0.1 mm to 5 mm, and particularly preferably from 2 mm to 4 mm.

The shallow groove portion 6b has a depth "b" of suitably from 1 mm to 10 mm, and particularly suitably from about 2 mm to about 5 mm. When the depth is 2 mm or more, the overhang portion 5b is fitted into the shallow groove portion 6b favorably. When the depth is 5 mm or less, the inner edge portion 3b (FIG. 2b) is high in strength, allowing the mold to resist damage.

A ratio of the width "a" to the depth "b" (a/b) is suitably from 0.01 to 10, and particularly suitably from about 0.4 to about 2.

A width "c" of the shallow groove portion 6b in the mating surface direction (i.e. its size in the direction orthogonal to the longitudinal direction of the groove) is suitably from 1 mm to 13 mm, and particularly suitably from about 2 mm to about 6 mm. A width of 2 mm or more ensures good sealing performance.

A width "d" of the deep groove portion 6a in the mating surface direction (i.e. its size in the direction orthogonal to the longitudinal direction of the groove) is suitably from 3 mm to 20 mm, and particularly suitably from about 6 mm to about 12 mm. A depth "e" of the deep groove portion 6a is suitably from 5 mm to 25 mm, and particularly suitably from about 10 mm to about 15 mm.

In the state where the mold is to be clamped, the packing seal 5 protrudes above the mating surface 3a by a protrusion height "h" of preferably from 0.1 mm to 10 mm, and particularly preferably from about 0.5 mm to about 2 mm. Furthermore, it is preferable that the packing seal is compression-deformed by mold clamping such that the protrusion height becomes 99% or less of its original height, and particularly preferably about 60% to about 95% thereof.

For molding using the mold 1 structured as described above, a releasing agent is first applied onto the inner surface of the mold 1 in its open state. Then, an undiluted urethane solution is supplied into the cavity 7 of the lower mold 3, which is followed by clamping of the mold. Urethane is then foamed by application of heat.

When urethane is foamed sufficiently enough to fill the interior of the cavity 7 with urethane foam, after another predetermined amount of time has elapsed, the mold is opened. As a result, a seat back pad molded product made of polyurethane foam is obtained.

In the present embodiment, the width "a" of the mating surface 3a in the inner edge portion 3b is as small as 0.1 mm to 10 mm. This ensures a small distance from the cavity 7 to the packing seal 5 when the mold is clamped. Therefore, when urethane is about to penetrate into between the mating surfaces 2a and 3a during foam molding, the gas pressure between the mating surfaces increases, preventing the urethane from entering into between the mating surfaces. As a result, no or almost no urethane will penetrate into between the mating surfaces of the upper mold 2 and the lower mold 3, thereby preventing formation of burrs. Furthermore, with no contact of urethane with the packing seal 5, deterioration of the packing seal 5 is prevented as well.

In the present embodiment, the groove 6 has the deep groove portion 6a into which the base portion 5a of the packing seal 5 is fitted deeply. This ensures that the packing seal 5 has a high fitting strength.

In the present embodiment, the shallow groove portion 6b is provided on the cavity 7 side of the groove 6. This ensures that the lower mold 3 has a sufficiently high strength in the vicinity of the inner edge portion 3b even if the width "a" of the inner edge portion 3b of the lower mold 3 is small. The processing accuracy required in forming the groove 6 by cutting or the like is also reduced.

Figure 3:
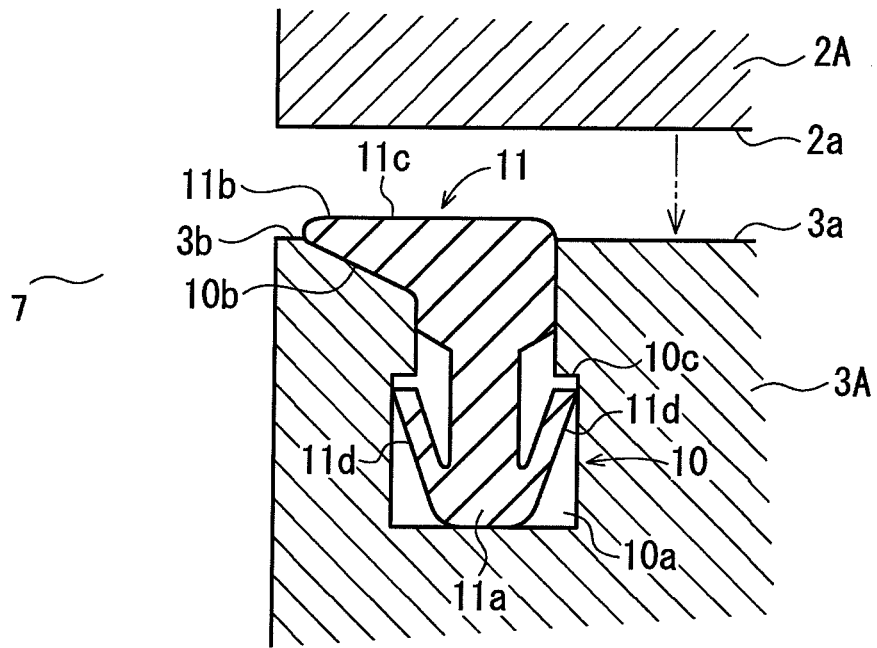
FIG. 3 is a cross-sectional view of a part of the mold according to another embodiment.
Figure 4:
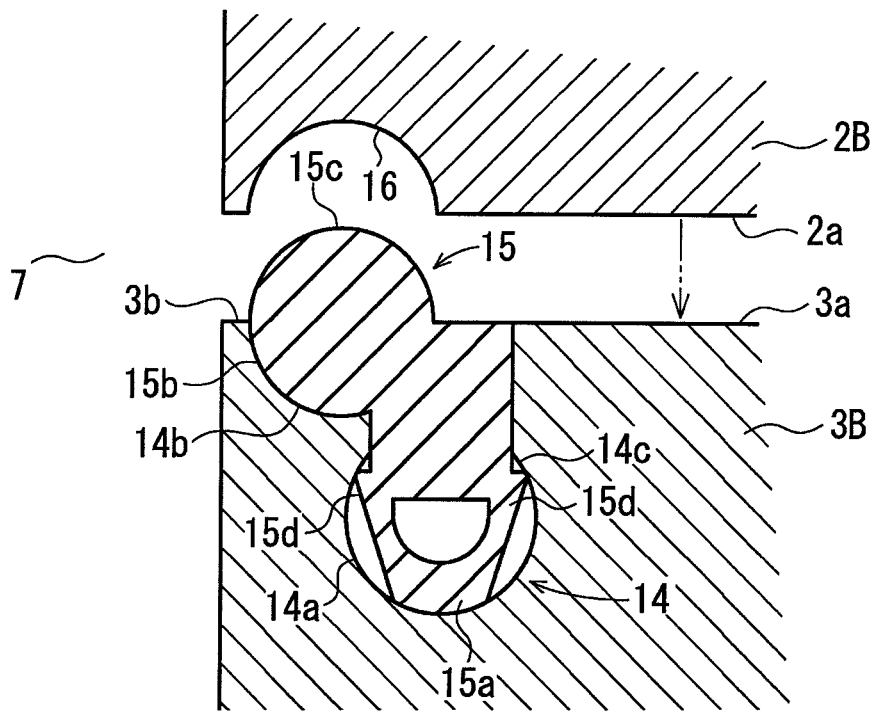
FIG. 4 is a cross-sectional view of a part of the mold according to another embodiment.

Referring to FIGS. 3 and 4, other embodiments will be described.

In FIG. 3, a lower mold 3A is provided with a groove 10, which has a deep groove portion 10a and a shallow groove portion 10b provided on the same side as the cavity 7 with respect to the deep groove portion 10a. The deep groove portion 10a is increased in width on its bottom side, with a step portion 10c formed halfway in the depth direction of the deep groove portion 10a. The shallow groove portion 10b has a depth that decreases with increasing distance from the deep groove portion 10a.

A packing seal 11 has a base portion 11a and an overhang portion 11b which overhangs from the base portion 11a toward the cavity 7. The overhang portion 11b has its underside abutted against the bottom of the shallow groove portion 10b. The base portion 11a of the packing seal 11 is provided with a fin-like lip portion 11d. This lip portion 11d comes to engage with the step portion 10c, thereby preventing the packing seal 11 from slipping off therefrom.

The packing seal 11 has a protruding portion 11c protruding above the mating surface 3a. The protruding portion 11c has an approximately horizontal surface at the top thereof. Alternatively, the top of the packing seal 11 may have a triangular shape in cross section, which is highest at the center and gradually decreases in height from the center toward the cavity side and toward the side opposite thereto, or may have a circular arc shape, a trapezoidal shape, or another shape in cross section.

An upper mold 2A has a mating surface 2a which is configured to be flat.

In FIG. 4, a lower mold 3B is provided with a groove 14, which has a deep groove portion 14a and a shallow groove portion 14b provided on the cavity 7 side of an entrance portion of the deep groove portion 14a. The deep groove portion 14a has a bottom part which is increased in width so as to have a circular shape in cross section, with a downward slope 14c formed halfway in the depth direction of the deep groove portion 14a. The shallow groove portion 14b has a concave quarter arc shape in cross section.

A packing seal 15 has a base portion 15a and an overhang portion 15b which overhangs from the base portion 15a toward the cavity 7.

The packing seal 15 has a protruding portion 15c at the top thereof, which protrudes above the mating surface 3a. The protruding portion 15c has an approximately semicircular arc shape in cross section, which is highest at the center in its width direction and gradually decreases in height toward its respective ends. The base portion 15a of the packing seal 15 has its side surface provided with an overhang portion 15d for the purposes of facilitating insertion of the packing seal into the deep groove portion 14a and preventing the packing seal from easily slipping off from the deep groove portion 14a. This overhang portion 15d comes to engage with the downward slope 14c, thereby preventing the packing seal 15 from slipping off therefrom.

An upper mold 2B has a mating surface 2a provided with a concave groove 16 having an approximately semicircular shape in cross section, which is positioned to face the protruding portion 15c of the packing seal 15. The width at the entrance of the concave groove 16 coincides with the width at the foot (on the mating surface 3a level) of the protruding portion 15c. The depth of the concave groove 16 is shorter than the protrusion height of the protruding portion 15c with respect to the mating surface 3a, ensuring that the packing seal 15 can be pressed sufficiently during the mold clamping process.

In each of the molds shown in FIGS. 3 and 4 as well, the mating surface 3a on the inner edge portion, extending from the cavity 7 side edge to the groove 10 or 14, has a width of from 0.1 mm to 10 mm, preferably from 0.1 mm to 5 mm, and particularly preferably from 2 mm to 4 mm. The shallow groove portion 10b or 14b, at its deepest portion, has a depth of suitably from 1 mm to 10 mm, and particularly suitably from about 2 mm to about 5 mm. The shallow groove portion 10b or 14b has a width in the mating surface direction of suitably from 1 mm to 13 mm, and particularly suitably from about 2 mm to about 6 mm. In the state where the mold is to be clamped, the packing seal 11 or 15 protrudes above the mating surface 3a by a protrusion height "h" of preferably from 0.1 mm to 10 mm, and particularly preferably from about 0.5 mm to about 2 mm. Furthermore, it is preferable that the packing seal is compression-deformed by mold clamping such that the protrusion height becomes 99% or less of its original height, and particularly preferably about 70% to about 95% thereof.

When a seat pad is foam-molded using one of the molds shown in FIGS. 3 and 4 as well, urethane is prevented from entering into between the mating surfaces 2a and 3a, thereby preventing burrs from being formed. Furthermore, deterioration of the packing seal is prevented. Moreover, the accuracy required in processing the groove 10 or 14 is reduced.

Figure 5A:
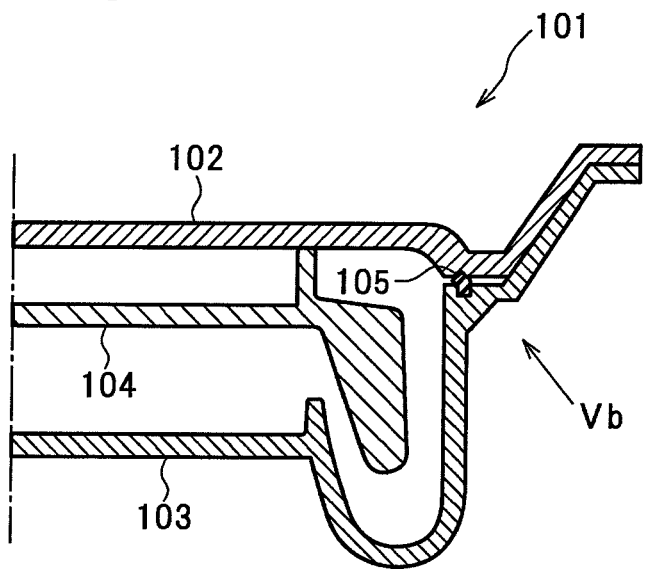
FIG. 5a is a longitudinal sectional view of the right half of a mold for molding a seat back pad according to a second embodiment.
Figure 5B:
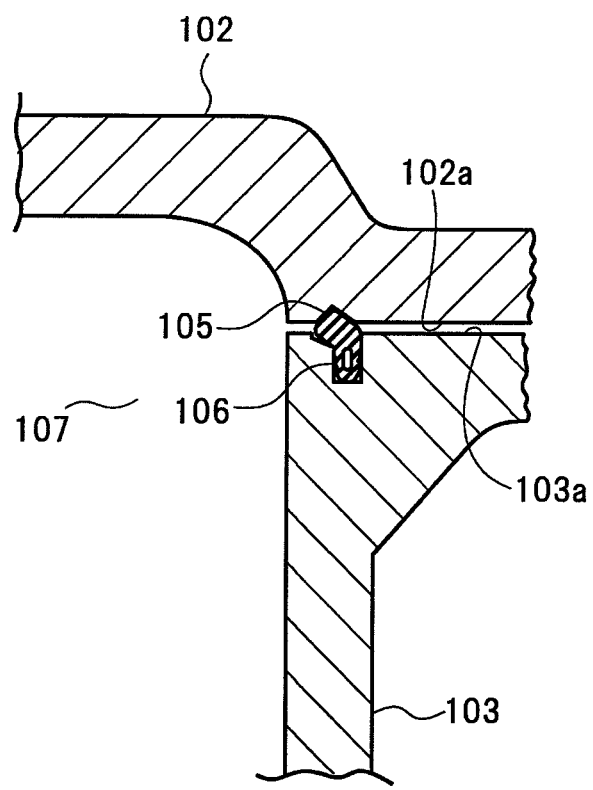
Figure 6A:
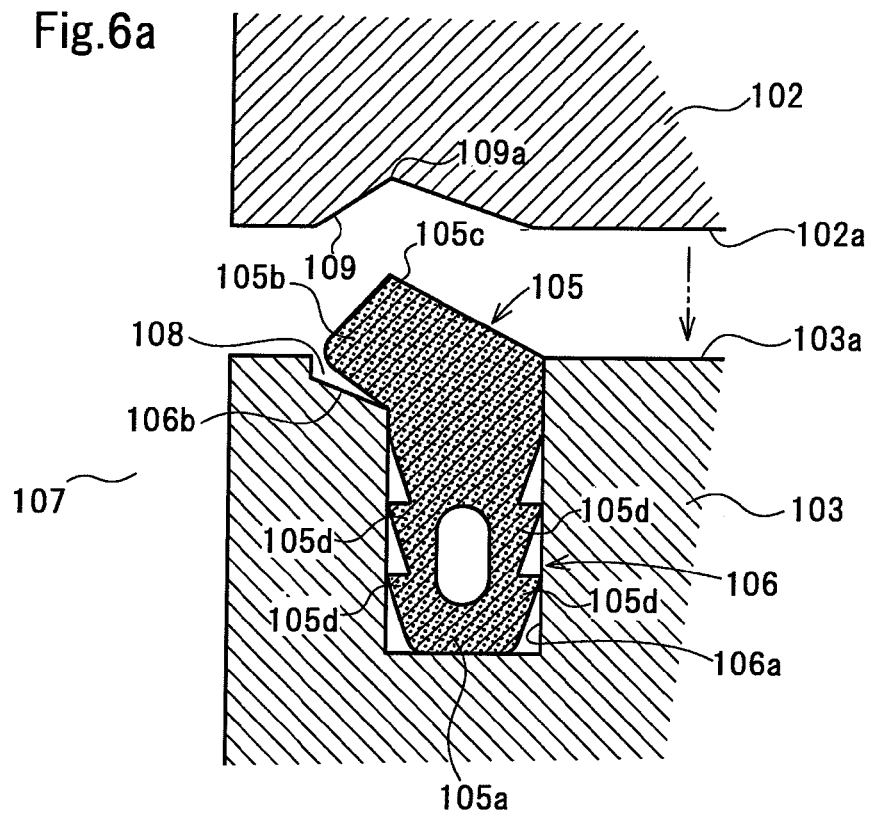
FIGS. 6a and 6b are an enlarged view of the Vb part just before the mold shown in FIG. 5a is clamped.
Figure 6B:
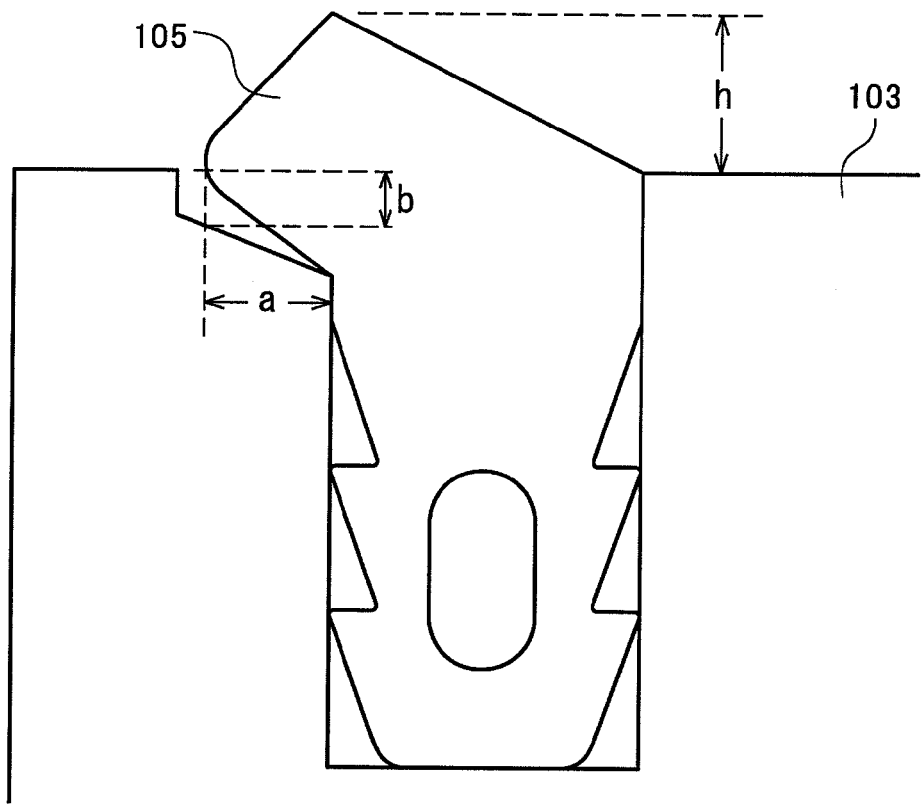

Hereinafter, a second embodiment of the present invention will be described with reference to the drawings. FIG. 5a is a longitudinal sectional view of the right half of a mold for molding a seat back pad according to the embodiment. FIG. 5b is an enlarged view of the Vb part in FIG. 5a. FIG. 6a is an enlarged view of the Vb part immediately before the mold is clamped. FIG. 6b is an explanatory diagram of dimensions of the packing seal portion.

A mold 101 according to the present embodiment is for use in molding an automotive seat back pad, and includes an upper mold 102, a lower mold 103, and a core 104 held by the upper mold 102. A packing seal 105 is provided between a mating surface of the upper mold 102 and a mating surface of lower mold 103.

As clearly shown in FIGS. 6a and 6b, according to the present embodiment, a groove 106 into which the packing seal is to be fitted is formed in a mating surface 103a of the lower mold 103 so as to extend around a cavity 107.

The groove 106 has a deep groove portion 106a which is deeply recessed from the mating surface 103a, and a shallow groove portion 106b which is located on the same side as the cavity 107 with respect to the deep groove portion 106a and continues to the deep groove portion. The shallow groove portion 106b is configured such that it is greatest in depth on the deep groove portion 106a side and its depth decreases as it approaches the cavity 107 side.

The packing seal 105 has a base portion 105a inserted into the deep groove portion 106a, and an overhang portion 105b which continues to the base portion 105a and is engaged with the shallow groove portion 106b. With the base portion 105a fitted in the deep groove portion 106a, the packing seal 105 is attached to the lower mold 103. It is noted that the base portion 105a has its side surface provided with a saw-tooth cross-section portion 105d for the purposes of facilitating insertion of the packing seal into the deep groove portion 106a and preventing the packing seal from easily slipping off from the deep groove portion 106a.

The packing seal 105 is made of rubber or an elastomer (preferably, one having a high resilience such as olefin elastomer, silicone rubber, or fluorocarbon rubber). The overhang portion 105b of the packing seal 105 has a shape and resilience that allow a void portion 108 to be formed between the overhang portion and the bottom of the shallow groove portion 106b in the state where the mold is open. This void portion 108 has a clearance space, i.e. a void width in the groove depth direction, which increases as it approaches the cavity 107 side.

The packing seal 105 has a protruding portion 105c protruding above the mating surface 103a. The top of the packing seal 105 has a triangular shape in cross section, which is highest at the peak of the protruding portion 105c and gradually decreases in height from the peak toward the cavity side and toward the side opposite thereto, although it may have a circular arc shape, a trapezoidal shape, or another shape in cross section.

The upper mold 102 has a mating surface 102a provided with a concave groove 109, which is positioned to face the packing seal 105. The depth of the concave groove 109 is shorter than the protrusion height of the packing seal 105 with respect to the mating surface 103a, ensuring that the packing seal 15 can be pressed sufficiently during the mold clamping process. The concave groove 109 has a deepest portion 109a which is configured to engage with the highest portion of the protruding portion 105c. It is noted that the mating surface 102a may be configured to be flat, without the concave groove 109.

For molding using the mold 101 structured as described above, a releasing agent is first applied onto the inner surface of the mold 101 in its open state. Then, an undiluted urethane solution is supplied into the cavity 107 of the lower mold 103, which is followed by clamping of the mold. Urethane is then foamed by application of heat.

When urethane is foamed sufficiently enough to fill the interior of the cavity 107 with urethane foam, after another predetermined amount of time has elapsed, the mold is opened. As a result, a seat back pad molded product made of polyurethane foam is obtained.

According to the present embodiment, during the mold clamping process, the overhang portion 105b of the packing seal 105 is compression-deformed so as to be pushed into the void portion 108 and, further, spread slightly beyond the shallow groove portion 106b toward the cavity 107 side as well. This provides tight contact between the top of the packing seal 105 and the mating surface 102a of the upper mold, thereby ensuring good sealing performance. As a result, the gas from within the cavity 107 will not penetrate through the portion sealed with the packing seal 105, and no or almost no urethane will enter into between the mating surface of the upper mold 102 and the mating surface of the lower mold 103, thereby preventing formation of burrs.

Even in the case where a very small amount of urethane penetrates into between the mating surfaces 102a and 103a, the gas existent between the mating surfaces 102a and 103a would not leak out of the mold, thereby increasing the gas pressure between the mating surfaces 102a and 103a. The gas pressure thus increased due to penetration of urethane prevents the urethane from penetrating more deeply into between the mating surfaces 102a and 103a. As a result, little or no burrs are formed, making deburring unnecessary.

Referring to FIGS. 7 to 10, other embodiments will be described.

Figure 7:
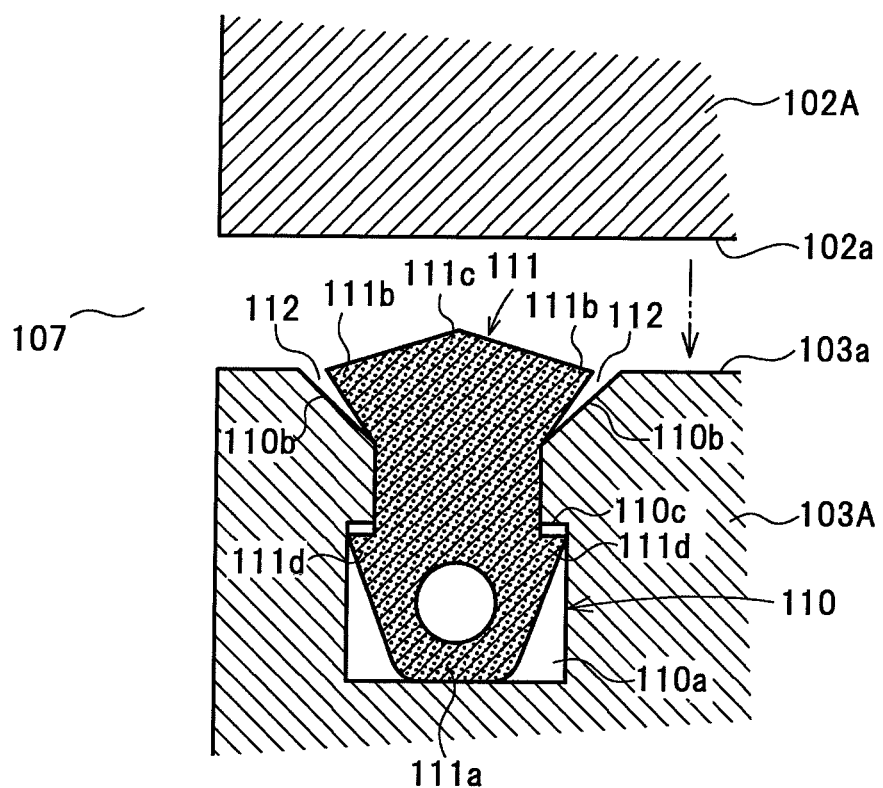
FIG. 7 is a cross-sectional view of a part of the mold according to another embodiment.

In FIG. 7, a lower mold 103A is provided with a groove 110, which has a deep groove portion 110a and also has shallow groove portions 110b and 110b that are provided on respective sides, or on the cavity 107 side and on the side opposite thereto, of an entrance portion of the deep groove portion 110a. The deep groove portion 110a is increased in width in its bottom side, with a step portion 110c formed halfway in the depth direction of the deep groove portion 110a. Each shallow groove portion 110b has a depth that decreases with increasing distance from the deep groove portion 110a.

A packing seal 111 has a base portion 111a and overhang portions 111b and 111b which overhang from the base portion 111a toward the cavity 107 side and toward the side opposite thereto, respectively. In the state where the mold is open, a void portion 112 is provided between the underside of each overhang portion 111b and the bottom of the corresponding shallow groove portion 110b. This void portion 112 has a clearance space the size of which increases with increasing distance from the deep groove portion 110a.

The packing seal 111 has a protruding portion 111c protruding above the mating surface 103a at the top thereof. The protruding portion 111c has a triangular shape in cross section, which is highest at the center in its width direction and gradually decreases in height toward the respective ends. The base portion 111a of the packing seal 111 is provided with a lateral protruding portion 111d. This lateral protruding portion 111d comes to engage with the step portion 110c, thereby preventing the packing seal 111 from slipping off therefrom.

The upper mold 102A has a mating surface 102a which is configured to be flat.

In FIG. 8, a lower mold 103B is provided with a groove 114, which has a deep groove portion 114a and a shallow groove portion 114b which is provided on the cavity 107 side of an entrance portion of the deep groove portion 114a. The deep groove portion 114a has a bottom part which is increased in width so as to have a circular shape in cross section, with a downward slope 114c formed halfway in the depth direction of the deep groove portion 114a. The shallow groove portion 114b has a depth that decreases with increasing distance from the deep groove portion 114a, or in other words, its depth decreases as it approaches the cavity 107 side. In the present embodiment, the shallow groove portion 114b has a concave curved shape in cross section.

A packing seal 115 has a base portion 115a and an overhang portion 115b which overhangs from the base portion 115a toward the cavity 107. In the state where the mold is open, a void portion 116 is provided between the underside of the overhang portion 115b and the bottom of the shallow groove portion 114b. This void portion 116 has a clearance space the size of which decreases with increasing distance from the deep groove portion 114a.

The packing seal 115 has a protruding portion 115c at the top thereof, which protrudes above the mating surface 103a. The protruding portion 115c has an approximately circular arc shape in cross section, which is highest at the center in its width direction and gradually decreases in height toward its respective ends. The base portion 115a of the packing seal 115 is provided with a fin-like lip portion 115d. This lip portion 115d comes to engage with the downward slope 114c, thereby preventing the packing seal 115 from slipping off therefrom.

The upper mold 102B has a mating surface 102a which is configured to be flat.

In FIG. 9, a lower mold 103C is provided with a groove 118, which has a deep groove portion 118a and also has shallow groove portions 118b and 118b that are provided on respective sides, or on the cavity 107 side and on the side opposite thereto, of an entrance portion of the deep groove portion 118a. The deep groove portion 118a has a bottom part which is increased in width so as to have a circular shape in cross section, with a downward slope 118c formed halfway in the depth direction of the deep groove portion 118a. Each shallow groove portion 118b has a depth that decreases with increasing distance from the deep groove portion 118a.

A packing seal 119 has a base portion 119a and overhang portions 119b and 119b which overhang from the base portion 119a toward the cavity 107 side and toward the side opposite thereto, respectively. In the state where the mold is open, the overhang width of each overhang portion 119b is smaller than the width of the corresponding shallow groove portion 118b, so that a void portion 120 is provided between an end in the overhang direction of each overhang portion 119b and the bottom of the corresponding shallow groove portion 118b.

The packing seal 119 has a protruding portion 119c at the top thereof, which protrudes above the mating surface 103a. The protruding portion 119c has a circular arc shape in cross section, which is highest at the center in its width direction and gradually decreases in height toward its respective ends, although it may have a triangular shape or a trapezoidal shape in cross section. The base portion 119a of the packing seal 119 is provided with a fin-like lip portion 119d. This lip portion 119d comes to engage with the downward slope 118c, thereby preventing the packing seal 119 from slipping off therefrom.

The upper mold 102C has a mating surface 102a which is configured to be flat.

Figure 10:
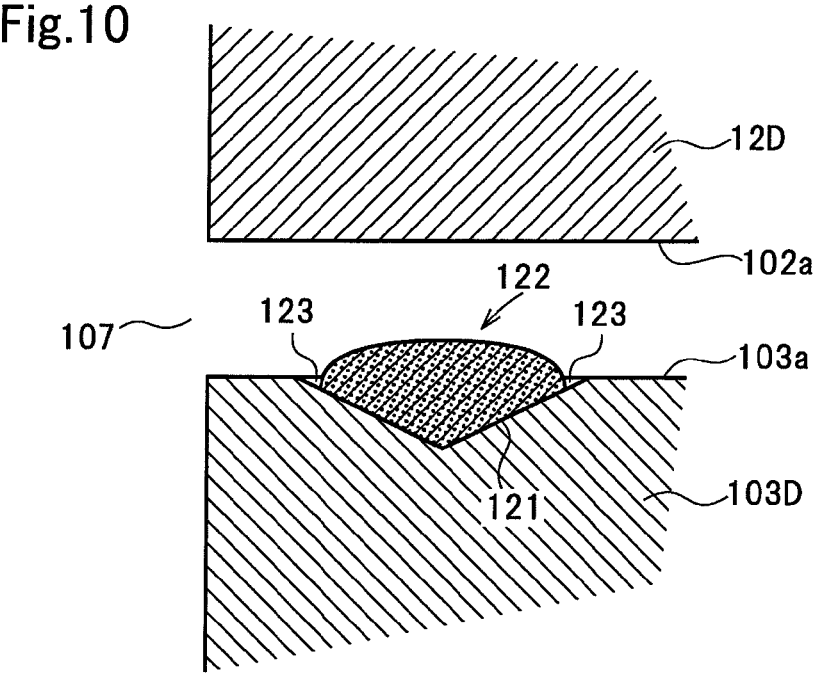
FIG. 10 is a cross-sectional view of a part of the mold according to another embodiment.
Figure 11:
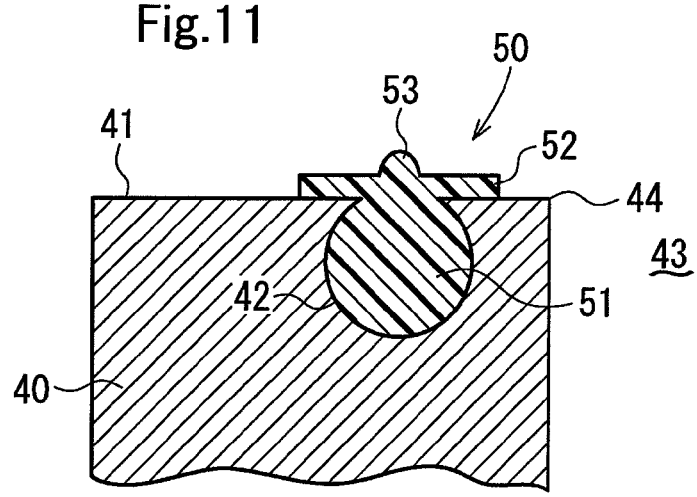
FIG. 11 is a cross-sectional view illustrating the structure of a packing seal portion in a mold according to a conventional example.
Figure 12:
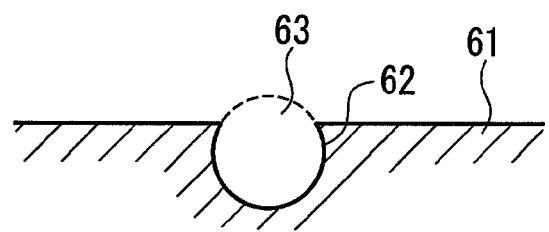
FIG. 12 is a cross-sectional view illustrating the structure of a packing seal portion in a mold according to another conventional example.

In FIG. 10, a lower mold 103D is provided with a groove 121, which has a V shape in cross section, with no deep groove portion. Alternatively, the groove 121 may have a circular arc shape, an inverted trapezoidal shape, or another shape in cross section.

A packing seal 122 has a width smaller than that of the groove 121, so that a void portion 123 is provided between each end in the width direction of the packing seal 122 and the bottom of the groove 121. The top of the packing seal 122 has a circular arc shape in cross section, which is similar to that of the packing seal 119, although it may have a triangular shape or a trapezoidal shape in cross section. The packing seal 122 is bonded to the bottom of the grove 121 with an adhesive, an adhesive tape, or the like.

In the case of foam-molding a seat pad using any of the molds shown in FIGS. 7 to 10 as well, urethane is prevented from entering into between the mating surfaces 102a and 103a, thereby preventing burrs from being formed.

In each of the embodiments shown in FIGS. 5 to 8, in the state where the mold is open, a width in the mating surface direction of the void portion 108, 112, or 116, i.e. its size (for example, the size "a" in FIG. 6b) in the direction orthogonal to the longitudinal direction of the corresponding groove, is suitably from 1 mm to 15 mm, and particularly suitably from about 2 mm to about 6 mm. Further, a maximum size of the clearance space in the void portion 108, 112, or 116 (for example, the size "b" in FIG. 6b) is suitably 10 mm or less, and particularly suitably from about 0.1 mm to about 10 mm.

In each of the embodiments shown in FIGS. 9 and 10, in the state where the mold is open, the size of the void portion 120 or 123 in the direction orthogonal to the longitudinal direction of the corresponding groove is suitably from 1 mm to 15 mm, and particularly suitably from about 2 mm to about 6 mm. Further, a depth of the void portion 120 or 123 at its deepest part is suitably from about 1 mm to about 10 mm.

In the above embodiments, in the state where the mold is to be clamped, a protrusion height (for example, "h" in FIG. 6b) of the packing seal with respect to the mating surface 103a is preferably from 0.1 mm to 10 mm, and particularly preferably from about 1 mm to about 5 mm. Furthermore, it is preferable that the packing seal is compression-deformed by mold clamping such that the protrusion height becomes 99% or less of its original height, and particularly preferably about 60% to about 95% thereof.

While a seat back pad is molded in the above embodiments, a seat cushion pad can also be molded in a similar manner. The present invention is also applicable to molding of resin foam molded products other than the seat pads.

The present invention is applicable, not only to the mating surfaces of the upper and lower molds, but also to any portions where pieces of the mold are to be mated, including the mating portions of the upper mold and the core, and the mating portions of the lower mold and the core.

While the present invention has been described in detail with reference to the particular embodiments, it will be apparent to those skilled in the art that various modifications are possible without departing from the scope and spirit of the invention.

It is noted that this application is based on Japanese Patent Applications (Nos. 2008-139704 and 2008-139705) filed as of May 28, 2008, the entirety of which is hereby incorporated by reference.

The invention claimed is:

1. A foam molding mold, comprising:
a packing seal provided between mating surfaces of pieces of the mold so as to extend along a cavity of the mold,
the packing seal being held in a groove provided in a mating surface, wherein
in a state where the mold is open, a void portion is provided along the packing seal and the packing seal protrudes from the mating surface, and upon clamping of the mold, the packing seal is pushed into the void portion, and
wherein the groove includes a deep groove portion, and a shallow groove portion which continues to the deep groove portion and is shallower than the deep groove portion wherein the shallow groove portion is located at least closer to a cavity side than the deep groove portion, and
the shallow groove portion comprises a depth such that said depth is on a side of the deep groove portion and decreases as the shallow groove portion approaches to the cavity side a depth thereof on a deep groove portion side is greatest and the depth decreases as the shallow groove portion approaches a cavity side.

2. The foam molding mold according to claim 1, wherein a portion of the respective mating surface that extends from an edge of the portion of the respective mating surface on the cavity side to a near end of the groove has a width of from 0.1 mm to 10 mm.

3. The foam molding mold according to claim 2, wherein a base portion of the packing seal is fitted into the deep groove portion, and an overhang portion of the packing seal is engaged with the shallow groove portion.

4. The foam molding mold according to claim 2, wherein said width is from 0.1 mm to 5 mm.

5. The foam molding mold according to claim 1, wherein a base portion of the packing seal is fitted into the deep groove portion, and an overhang portion of the packing seal is engaged with the shallow groove portion, and
in a state where the mold is open, the void portion is provided between the overhang portion and the shallow groove portion.

6. The foam molding mold according to claim 2, wherein in a state where the mold is open, an overhang portion has at least a part separated from the shallow groove portion, and the void portion is formed between the separated part and a bottom of a shallow groove portion.

7. The foam molding mold according to claim 6, wherein the void has a width in a groove depth direction that increases with increasing distance from a deep groove portion.

8. The foam molding mold according to claim 6, wherein the void has a width in a groove depth direction that decreases with increasing distance from a deep groove portion.

9. The foam molding mold according to claim 6, wherein the void portion has a width in a groove depth direction of not greater than 10 mm.

10. The foam molding mold according to claim 6, wherein the shallow groove portion has a width in a direction along the respective mating surface of from 1 mm to 15 mm.

11. The foam molding mold according to claim 6, wherein the overhang portion, in a vicinity of an end of the overhang portion in a direction away from a deep groove portion, has a thickness that decreases with increasing distance from the deep groove portion.

\* \* \* \* \*